(12) United States Patent
Fukui

(10) Patent No.: US 10,125,445 B2
(45) Date of Patent: Nov. 13, 2018

(54) LAUNDRY TREATING APPARATUS

(71) Applicant: LG ELECTRONICS INC., Seoul (KR)

(72) Inventor: Ikuma Fukui, Gyeongnam (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/402,337

(22) PCT Filed: Jul. 10, 2013

(86) PCT No.: PCT/KR2013/006138
§ 371 (c)(1),
(2) Date: Nov. 20, 2014

(87) PCT Pub. No.: WO2014/035046
PCT Pub. Date: Mar. 6, 2014

(65) Prior Publication Data
US 2015/0299928 A1    Oct. 22, 2015

(30) Foreign Application Priority Data
Aug. 27, 2012   (KR) .................. 10-2012-0093880

(51) Int. Cl.
*D06F 37/26* (2006.01)
*D06F 37/30* (2006.01)
(Continued)

(52) U.S. Cl.
CPC .......... *D06F 37/267* (2013.01); *D06F 37/203* (2013.01); *D06F 37/22* (2013.01);
(Continued)

(58) Field of Classification Search
USPC ........................................ 68/3 R
See application file for complete search history.

(56) References Cited

U.S. PATENT DOCUMENTS 4,320,636 A    3/1982   McMillan
7,841,220 B2*  11/2010  Lim ................. D06F 37/22
                                            68/13 R
(Continued)

FOREIGN PATENT DOCUMENTS

CN    1928204    3/2007
CN    102301059  11/2011
(Continued)

OTHER PUBLICATIONS

International Search Report dated Jan. 20, 2014 for Application No. PCT KR 2013/006138, 2 pages.
(Continued)

*Primary Examiner* — Jason Y Ko
*Assistant Examiner* — Cristi J Tate-Sims
(74) *Attorney, Agent, or Firm* — Fish & Richardson P.C.

(57) ABSTRACT

There is disclosed a laundry treating apparatus (100) including a cabinet (1) comprising an opening (11) through which laundry is introduced, a tub (2) provided in the cabinet (1), the tub (2) comprising a tub opening (21) in communication with the opening (11), a drum (3) provided in the tub (2) to store the laundry therein, the drum (3) comprising a drum opening (31) in communication with the tub opening (21), a drum supporting unit (L, H) configured to levitate the drum (3) within the tub (2), using a repulsive force generated between magnetic units (51, 52, 53, 54) having the same magnetic pole, a motor (61) mounted to an outer portion of the tub (2), the motor (61) comprising a shaft (615), and a coupler (63) configured to connect the drum (3) and the shaft (615) with each other so as to rotate the drum (3) and to make a rotation center of the drum (3) be movable with respect to a rotation center of the shaft (615) in a predetermined distance range, similar to an Oldham coupling.

7 Claims, 13 Drawing Sheets

(51) Int. Cl.

| | | |
|---|---|---|
| *D06F 37/22* | (2006.01) | |
| *F16D 3/04* | (2006.01) | |
| *F16C 32/04* | (2006.01) | |
| *D06F 37/20* | (2006.01) | |
| *D06F 39/12* | (2006.01) | |
| *F16F 15/03* | (2006.01) | |
| *D06F 23/00* | (2006.01) | |

(52) U.S. Cl.
CPC .............. *D06F 37/30* (2013.01); *D06F 39/12* (2013.01); *F16C 32/0425* (2013.01); *F16D 3/04* (2013.01); *F16F 15/03* (2013.01); *D06F 23/00* (2013.01); *D06F 37/20* (2013.01); *F16C 2340/00* (2013.01)

(56) References Cited

U.S. PATENT DOCUMENTS

| | | | |
|---|---|---|---|
| 2004/0174079 A1 | 9/2004 | Izraelev | |
| 2007/0196131 A1* | 8/2007 | Sato | F16D 3/04 399/167 |
| 2012/0006068 A1* | 1/2012 | Song | D06F 37/206 68/140 |

FOREIGN PATENT DOCUMENTS

| | | |
|---|---|---|
| DE | 199 19 947 A1 | 11/2000 |
| EP | 1 433 890 A2 | 6/2004 |
| EP | 1 050 617 B1 | 8/2004 |
| GB | 715459 A | 9/1954 |
| IT | MI 942489 A1 | 6/1996 |
| IT | 1275691 B1 * | 10/1997 |
| JP | 1993146584 | 6/1993 |
| KR | 1019930010163 | 10/1993 |
| KR | 10-2009-0097699 | 9/2009 |
| KR | 20090097699 A * | 9/2009 |
| WO | WO 2006/067649 A2 | 6/2006 |
| WO | 2006/083083 | 8/2006 |

OTHER PUBLICATIONS

European Search Report dated Oct. 29, 2015, for European Application No. 13834211.8, 6 pages.

Office Action issued in Chinese Application No. 201380030315.4 dated Feb. 3, 2016, 10 pages (with English translation).

* cited by examiner (a)

(b)

(c)

(a)

(b)

(a)  (b)

(a)

(b)

(a)

(b)

LAUNDRY TREATING APPARATUS

CROSS REFERENCE TO RELATED APPLICATIONS

This application is a U.S. National Phase Application under 35 U.S.C. § 371 of International Application PCT/KR2013/006138, filed on Jul. 10, 2013, which claims the benefit of Korean Application No. 10-2012-0093880, filed on Aug. 27, 2012, the entire contents of which are hereby incorporated by reference in their entireties.

TECHNICAL FIELD

The present invention relates to a laundry treating apparatus that may reduce vibration and noise.

BACKGROUND ART

A conventional laundry treating apparatus includes a cabinet for defining an exterior appearance, a tub mounted in the cabinet, a drum rotatably mounted in the tub to wash laundry and a motor having a shaft fixedly coupled to the drum via the tub to rotate the drum.

The tub is supported in the cabinet by a spring and a damper. Such a spring connects an internal upper portion of the cabinet and an upper portion of the tub with each other and such a damper connects an internal bottom of the cabinet and a lower portion of the tub with each other.

Especially, the damper is coupled to both lower portions of the tub by a hinge, to absorb the vibration transferred to the tub when the drum is rotating.

More specifically, the damper includes a cylinder coupled to both lower portions of the tub by a hinge, and a cylindrical piston connected to the bottom of the cabinet by a hinge in a state of being movable in the cylinder, and a damping pad attached to an outer circumferential surface of the piston to generate friction against an inner circumferential surface of the cylinder.

However, even with the damper, such the conventional laundry treating apparatus has a limited ability of reducing vibration.

In other words, the conventional laundry treating apparatus has the motor fixedly coupled to a rear surface of the tub and the motor has the shaft that passes through the rear surface of the tub in a state of being supported by a bearing fixed to the tub. Accordingly, in the structure of the conventional laundry treating apparatus, the vibration generated by the rotating drum and the motor is transferred to the tub. Even though reduced by the damper and the spring, the vibration transferred to the tub might be transferred to the cabinet. In addition, the vibration of the tub caused by the rotating drum and the vibration of the cabinet might increase disadvantageously in case the drum is rotated in an unbalanced state that a dynamic balance is lost.

The dynamic balance, namely, dynamic equilibrium means a state that a centrifugal force or a moment created by a centrifugal force is zero with respect to a shaft, when a body of rotation rotates. When having a uniform mass distribution, a rigid body keeps dynamic balance.

Accordingly, it can be understood that a dynamic balance of a laundry treating apparatus is kept when mass distribution of laundry with respect to a shaft of a drum is in an allowable range (when the drum is rotated with vibrating within an allowable vibration range).

In contrast, a state that a dynamic balance is lost, in other words, unbalance means that mass distribution with respect to a shaft of a drum is not uniform when the drum is rotating. Such an unbalance state is caused when the laundry is not distributed in the drum uniformly.

DISCLOSURE

Technical Problem

An object of the present invention is to provide a laundry treating apparatus that may reduce the vibration and noise generated by rotation of a drum.

Another object of the present invention is to provide a laundry treating apparatus that may reduce the vibration and noise by levitating the drum in a tub.

A further object of the present invention is to provide a laundry treating apparatus that may include the drum rotatable in a state where a rotation center of the drum is eccentric with respect to the shaft of the motor only to prevent the vibration generated by the rotation of the drum from being transferred to the tub via a shaft of a motor.

A still further object of the present invention is to provide a laundry treating apparatus that may maximize the volume of the tub provided in a cabinet providing a limited space.

A still further object of the present invention is to provide a laundry treating apparatus that may prevent the vibration of the tub from being transferred to the cabinet via a gasket configured to seal the tub.

Technical Solution

To achieve these objects and other advantages and in accordance with the purpose of the invention, as embodied and broadly described herein, a laundry treating apparatus includes a cabinet comprising an opening through which laundry is introduced; a tub provided in the cabinet, the tub comprising a tub opening in communication with the opening; a drum provided in the tub to store the laundry therein, the drum comprising a drum opening in communication with the tub opening; a drum supporting unit configured to levitate the drum within the tub, using a repulsive force generated between magnetic units having the same magnetic pole; a motor mounted to an outer portion of the tub, the motor comprising a shaft; and a coupler configured to connect the drum and the shaft with each other so as to rotate the drum and to make a rotation center of the drum be movable with respect to a rotation center of the shaft in a predetermined distance range.

The coupler may include a drum coupled portion coupled to the drum; a shaft coupled portion coupled to the shaft; a connected portion provided between the shaft coupled portion and the drum coupled portion; a coupled portion guide provided between the drum coupled portion and the connected portion to supportively guide reciprocation of the drum coupled portion along a radial direction of the connected portion; and a connected portion guide provided between the connected portion and the shaft coupled portion to supportively guide reciprocation of the connected portion along a radial direction of the shaft coupled portion.

The coupled portion guide may include a coupled portion rail provided in one of the drum coupled portion and the connected portion; and a coupled portion rail receiving groove provided in the other one of the drum coupled portion and the connected portion to receive the coupled portion rail movably, and the connected portion guide may include a connected portion rail provided in one of the shaft coupled portion and the connected portion; and a connected portion rail receiving groove provided in the other one of the shaft coupled portion and the connected portion to receive the connected portion rail movably.

The coupled portion rail may be provided along a radial direction of one of the drum coupled portion and the connected portion, and the connected portion rail may be provided along a radial direction of the shaft coupled portion and the connected portion, and the coupled portion rail and the connected portion rail may be spaced apart a predetermined distance 90 degrees from each other.

The motor may further include a first guider provided in an outer circumferential surface of the shaft along a longitudinal direction of the shaft, and the shaft coupled portion may further include a shaft receiving groove configured to receive the shaft; and a second guider provided in an outer circumferential surface of the shaft receiving groove to be coupled to the first guider, and the shaft coupled portion may reciprocate along a longitudinal direction of the shaft by the first guider and the second guider.

The coupled portion guide may include a coupled portion rail provided in one of the drum coupled portion and the connected portion; a coupled portion rail guide provided in the other one of the drum coupled portion and the connected portion; and a coupled portion rail receiving groove provided in the coupled portion rail guide to receive the coupled portion rail, and the connected portion guide may include a connected portion rail provided in one of the shaft coupled portion and the connected portion; a connected portion rail guide provided in the other one of the shaft coupled portion and the connected portion; and a connected portion rail receiving groove provided in the connected portion rail guide to receive the connected portion rail.

The coupled portion rail may be provided in a radial direction of one of the drum coupled portion and the connected portion, and the connected portion rail may be provided in along a radial direction of one of the shaft coupled portion and the connected portion, and the coupled portion rail and the connected portion rail may be spaced apart a predetermined distance 90 degrees from each other.

The coupler may include a drum coupled portion coupled to the drum; a drum coupled portion rail provided along a radial direction of the drum coupled portion; a shaft coupled portion coupled to the shaft; a shaft coupled portion rail provided along a radial direction of the shaft coupled portion; and a guider comprising a body provided between the shaft coupled portion and the drum coupled portion; a first rail guide provided in one surface of the body toward the drum coupled portion to receive the drum coupled portion rail, and a second rail guide provided in one surface of the body toward the shaft coupled portion to receive the shaft coupled portion rail.

The drum coupled portion rail and the shaft coupled portion rail may be spaced apart a predetermined distance 90 degrees from each other.

The coupler may include a drum coupled portion coupled to the drum; a shaft coupled portion coupled to the shaft; a connected portion provided between the shaft coupled portion and the drum coupled portion; a shaft coupled portion link comprising one end rotatably coupled to the connected portion and the other end rotatably coupled to the shaft coupled portion, to transfer a rotational force of the shaft coupled portion to the connected portion; and a drum coupled portion link comprising one end rotatably coupled to the drum coupled portion and the other end rotatably coupled to the connected portion, to transfer a rotational force of the connected portion to the drum coupled portion.

The shaft coupled portion link may include three bars spaced apart a predetermined distance 120 degrees from each other, and the drum coupled portion link may include three bars spaced apart a predetermined distance 120 degrees from each other.

The coupler may include a drum coupled portion coupled to the drum; a shaft coupled portion coupled to the shaft; a connected portion formed of a flexible material and configured to connect the shaft coupled portion and the drum coupled portion with each other.

The connected portion may include a connection pipe formed of a rubber material; a flexible plate provided in the connection pipe; and a metallic plate provided in the connection pipe.

A plurality of flexible and metallic plates may be disposed alternately.

The drum supporting unit may levitate the drum within the tub to make the drum movable in a radial direction with respect to a rotation axis of the drum within the tub.

The drum supporting unit may include a first magnetic unit provided along a circumferential surface of the tub; and a second magnetic unit provided along a circumferential surface of the drum, provided a repulsive force from the first magnetic unit, and the first magnetic unit and the second magnetic unit are permanent magnets.

The drum supporting unit may further include a vibration absorption unit provided between the first magnetic unit and an inner circumferential surface of the tub to provide an elastic force to the first magnetic unit.

The drum supporting unit further include a magnetic force amplification unit configured to increase a repulsive force between the first magnetic unit and the second magnetic unit, and the magnetic force amplification unit comprises a metallic material provided between the first magnetic unit and the inner circumferential surface of the tub; and a metallic material provided between the second magnetic unit and the outer circumferential surface of the drum.

The drum supporting unit may further include a vibration absorption unit provided between the first magnetic unit and an inner circumferential surface of the tub to provide an elastic force to the first magnetic unit; and a magnetic force amplification unit configured to increase a repulsive force between the first magnetic unit and the second magnetic unit, and the magnetic force amplification unit may include a metallic material provided between the first magnetic unit and the inner circumferential surface of the tub; and a metallic material provided between the second magnetic unit and the outer circumferential surface of the drum.

The drum supporting unit may further include a third magnetic unit provided in at least one of a rear surface and a front surface of the tub where the tub opening is formed; and a fourth magnetic unit provided in at least one of a rear surface and a front surface of the drum where the drum opening is formed to be provided a repulsive force from the third magnetic unit.

Advantageous Effects

According to at least one embodiments of the present invention, the laundry treating apparatus may reduce the vibration and noise generated by rotation of a drum.

Furthermore, the laundry treating apparatus may reduce the vibration and noise by levitating the drum in a tub.

Still further, the laundry treating apparatus may include the drum rotatable in a state where a rotation center of the drum is eccentric with respect to the shaft of the motor only to prevent the vibration generated by the rotation of the drum from being transferred to the tub via a shaft of a motor.

Still further, the laundry treating apparatus may maximize the volume of the tub provided in a cabinet providing a limited space.

Still further, the laundry treating apparatus may prevent the vibration of the tub from being transferred to the cabinet via a gasket configured to seal the tub.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

BEST MODE

Exemplary embodiments of the present invention will be described in detail as follows, referring to the accompanying drawings.

In the following detailed description, reference is made to the accompanying drawing figures which form a part hereof, and which show by way of illustration various embodiments.

Figure 1:
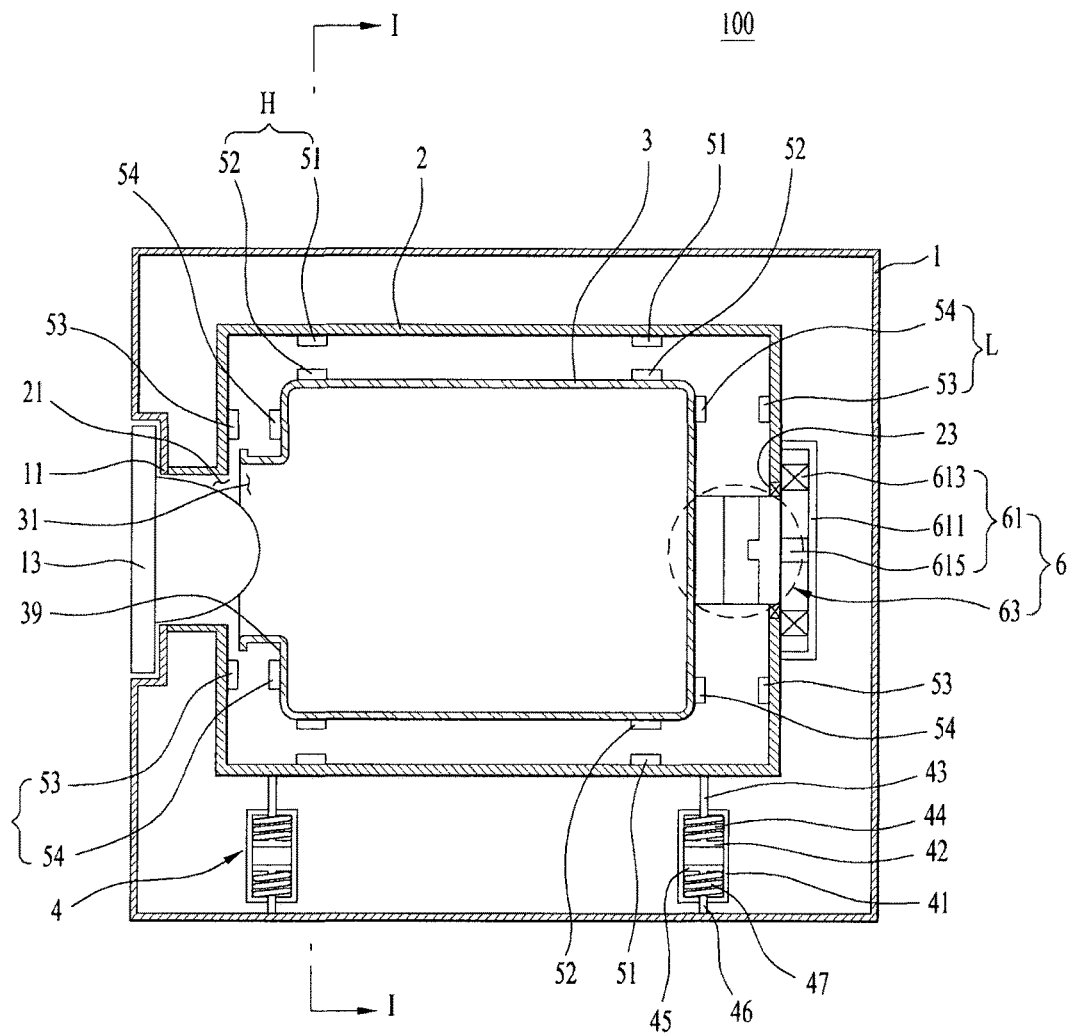
FIG. 1 is a diagram illustrating a structure of a laundry treating apparatus according to the present invention.

FIG. 1 is a diagram illustrating a laundry treating apparatus according to the present invention. A laundry treating apparatus 100 according to the present invention includes a cabinet 1 configured to define an exterior appearance thereof, a tub 2 mounted in the cabinet and a drum 3 rotatably mounted in the tub.

A laundry loading opening 11 is provided in the cabinet 1 to load or unload laundry into or out of the drum and the opening 11 is open and closed by a door 13.

The tub 2 is cylindrical-shaped and a tub opening 21 is provided in one surface of the tub to communicate with the laundry loading opening 11. In other words, the cylindrical tub 2 includes the tub opening 21 formed in one surface that faces the door to load and unload the laundry.

In case the laundry treating apparatus 100 is functioned to wash laundry, the tub 2 has to be configured to store wash water. However, in case the laundry treating apparatus 100 is functioned only to dry washed-laundry, the tub need not be configured to store wash water.

The drum 3 is rotatable in the tub by a drum driving unit 6 which will be described later and it includes a drum opening 31 in communication with the tub opening 21. Accordingly, a user may load or unload laundry into or from the drum out of the cabinet by opening and closing the door 13.

The tub 2 is fixed in the cabinet 1 by a tub supporting unit 4 and the tub supporting unit 4 uses a repulsive force in supporting the tub. Such a repulsive force is one of magnetic forces.

In other words, the tub supporting unit 4 provided in the laundry treating apparatus according to the present invention may be configured of an upper unit 42, 43 and 44 having N or S magnetic pole, a lower unit 45, 46 and 47 having the same magnetic pole as the upper unit, and a cylinder 41 configured to receive the upper unit and the lower unit.

The upper unit may include an upper piston 42 arranged in the cylinder 41, an upper rod 43 having one end fixedly coupled to the tub 2 and the other end fixedly coupled to the upper piston 42, and an upper coil 44 wound around the upper piston or the upper rod within the cylinder to magnetize the upper piston 42 when provided with electric currents.

The lower unit may include a lower piston 45 arranged in the cylinder, a lower rod 46 having one end fixedly coupled to the cabinet 1 and the other end fixedly coupled to the lower piston 45, and a lower coil 47 wound around the lower piston or the lower rod within the cylinder to magnetize the lower piston 45 when provided with electric currents.

In this instance, the upper coil 44 and the lower coil 47 may be magnetized so as to have the same magnetic pole. Accordingly, the tub 2 provided in the laundry treating apparatus according to the present invention may be supported in the cabinet 1 by the repulsive force generated between the upper piston 42 magnetized by the upper coil 44 and the lower piston 45 magnetized by the lower coil 47.

Although it will be described in detail later, the laundry treating apparatus 100 according to the present invention may prevent or minimize the vibration transferred from the drum 3 to the tub 2. Accordingly, the tub supporting unit 4 described above may not be provided in the laundry treating apparatus 100 necessarily.

Meanwhile, the laundry treating apparatus 100 according to the present invention may further include a drum supporting unit (L and H). The drum supporting unit 5 levitates the drum 3 within the tub 2 by using a repulsive force generated between a magnetic unit provided in the tub and a magnetic unit provided in the drum.

The drum supporting unit may include a height-direction magnetic unit (H) configured to levitate the drum along a height direction of the cabinet and a longitudinal-direction magnetic unit (L) configured to keep a distance between the tub and the drum along a longitudinal direction of the cabinet.

The height-direction magnetic unit (H) may include a first magnetic unit 51 provided in a circumferential surface of the tub 2 and a second magnetic unit 52 provided in a circumferential surface of the drum 3, with the same magnetic pole as the first magnetic unit.

The first magnetic unit 51 and the second magnetic unit 52 may be permanent magnets, respectively. The first magnetic unit 51 may be a permanent magnet provided in an inner circumferential surface (TI, see FIG. 2) or an outer circumferential surface (TO) of the tub, with an north pole (hereinafter, N pole) and a south pole (hereinafter, S pole), and the second magnetic unit 52 may be a permanent magnet provided in an outer circumferential surface (DO) or an inner circumferential surface (DI) of the drum.

In this instance, the first magnetic unit 51 and the second magnetic unit 52 may be arranged for the same magnetic poles thereof to face each other, such that the repulsive force generated between the two magnets can levitate the drum 3.

Figure 2:
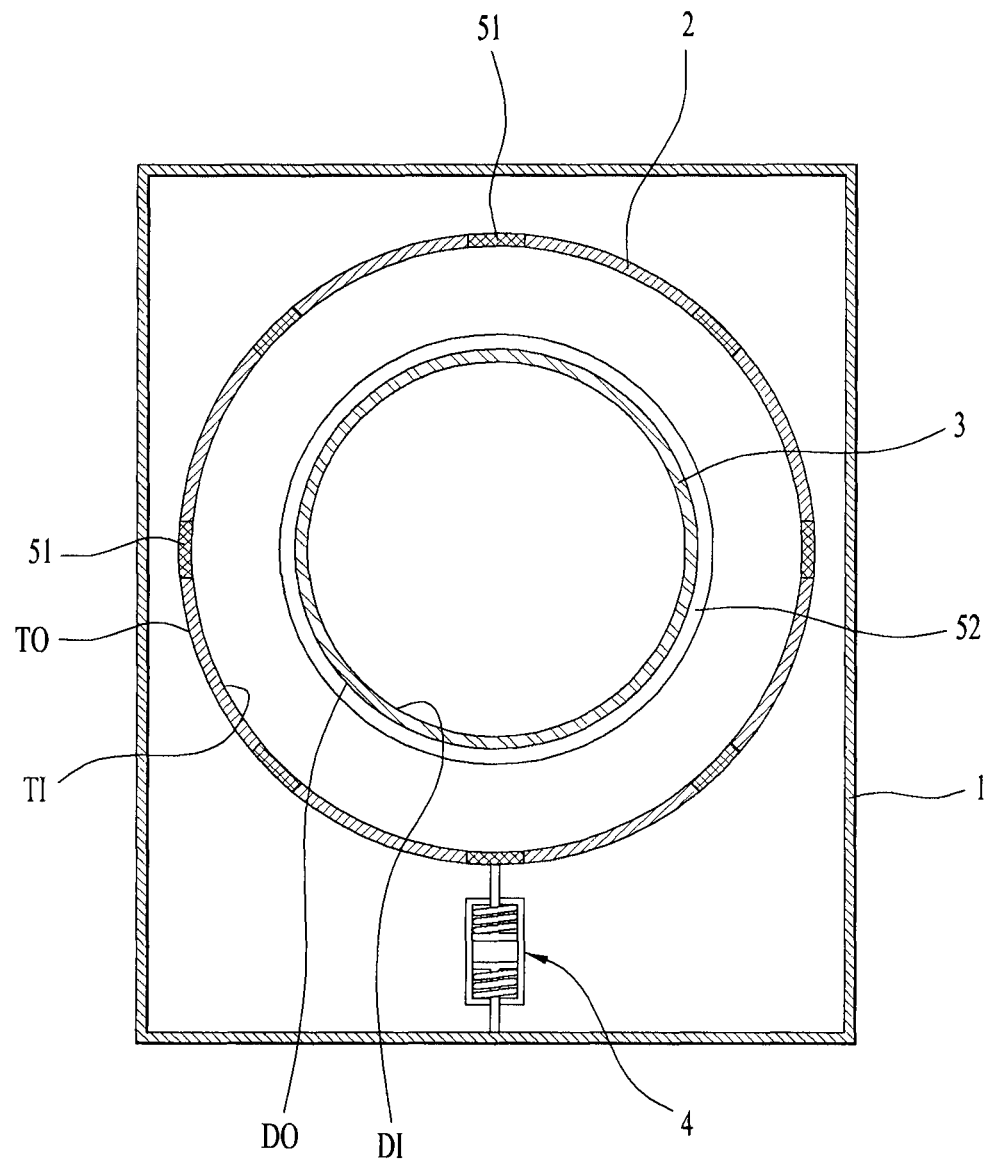
FIG. 2 is a diagram of I-I shown in FIG. 1.

Meanwhile, in case the first magnetic unit 51 is provided along a circumferential surface of the tub 2 discontinuously as shown in FIG. 2, the second magnetic unit 52 may be provided along a circumferential surface of the drum 3 continuously.

Here, in case the first magnetic unit 51 is provided in a cylindrical shape along the circumferential surface of the tub 2 continuously, the second magnetic unit 52 could be provided along the circumferential surface of the drum 3 discontinuously.

When provided along the circumferential surface of the tub 2 discontinuously, the first magnetic unit 51 may be a plurality of button-shaped permanent magnets spaced apart a predetermined distance from each other along the circumferential surface of the tub. In this instance, the tub magnetic unit 51 and 52 may be inserted in the circumferential surface of the tub 2.

The second magnetic unit 52 provided along the circumferential surface of the drum continuously may be a bar-shaped permanent magnet fixed in the circumferential surface of the drum.

Meanwhile, the longitudinal direction magnetic unit (L) mentioned above may include a third magnetic unit 53 provided each of back and front surfaces of the tub (the front surface is a surface where the laundry loading opening 11 is formed) as shown in FIG. 1 and a fourth magnetic unit 54 provided in each of back and front surfaces of the drum (the front surface where the opening 11 is positioned).

The third magnetic unit 53 and the fourth magnetic unit 54 may permanent magnets having both of N and S poles.

In this instance, the third magnetic unit 53 and the fourth magnetic unit 54 may be arranged for the same magnetic poles to face each other, to make the repulsive force between them keep a forward-and-backward gap between the tub 2 and the drum 3 (the third and fourth magnetic units may be arranged so that N pole of the third magnetic unit and N pole of the fourth magnetic unit face each other or S pole of the third magnetic unit and S pole of the fourth magnetic unit face each other).

Accordingly, the drum 3 provided in the laundry treating apparatus according to the present invention may maintain the levitated state by the height-direction magnetic unit (H) and the longitudinal direction magnetic unit (L). Even if the laundry is rotated in a state of being concentrated on a specific area of the drum (the laundry is rotated in the unbalance state), the gap between the outer circumferential surface of the drum and the inner circumferential surface of the tub can be maintained uniformly.

Meanwhile, the first magnetic unit 51 and the second magnetic unit 52 provided in the laundry treating apparatus 100 according to the present invention may have a structure shown in FIGS. 3 to 7.

Figure 3:
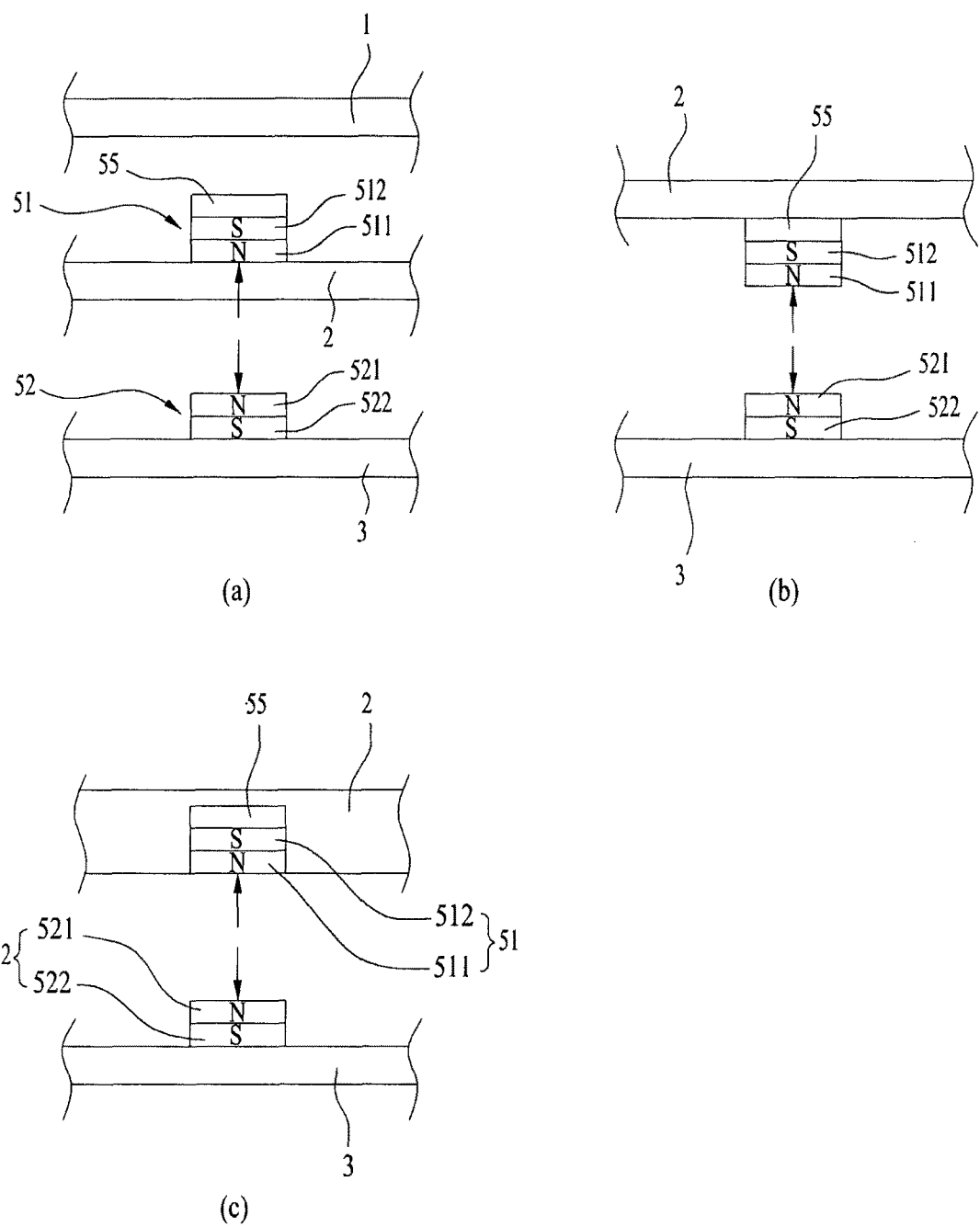
FIG. 3 is a diagram illustrating a drum supporting unit provided in the laundry treating apparatus.

As shown in FIG. 3, the first magnetic unit 51 may be fixed to an outer circumferential surface (see FIG. 3(*a*)) or an inner circumferential surface of the tub 2 (see FIG. 3(*b*)). Alternatively, the first magnetic unit 51 may be insertedly fixed to a circumferential surface of the tub 2 (see FIG. 3(*c*)).

In this instance, it is preferred that the second magnetic unit 52 is fixed to an outer circumferential surface of the drum 3 and it is not excluded that the second magnetic unit 52 is insertedly fixed to a circumferential surface of the drum 2.

In any cases, the first magnetic unit 51 and the second magnetic unit 52 have to be arranged for the same poles to face each other.

Meanwhile, the height-direction magnetic unit (H) may further include a vibration absorption unit 55 configured to restrain the vibration of the first magnetic unit from caused by the magnetic force acting between the second magnetic unit 52 and the first magnetic unit 51 during the vibration of the drum.

The vibration absorption unit 55 may be fixed in the first magnetic unit 51 to be positioned between the cabinet 1 and the first magnetic unit 51 (see FIG. 3(*a*)) or provided in an inner circumferential surface of the tub 2 to support the first magnetic unit 51 (see FIG. 3(*b*)).

In addition, in case the first magnetic unit 51 is insertedly fixed to a circumferential surface of the tub 2, the vibration absorption unit 55 may be inserted in an inner circumferential surface of the tub 2 to support the first magnetic unit 51 (see FIG. 3(*c*)).

In other words, in case the first magnetic unit 51 is insertedly fixed to the circumferential surface of the tub 2, it is preferred that an insertion hole is formed in the circumferential surface of the tub 2 to insert the first magnetic unit 51 therein such that the vibration absorption unit 55 may be provided in the insertion hole and support the first magnetic unit 51.

Figure 4:
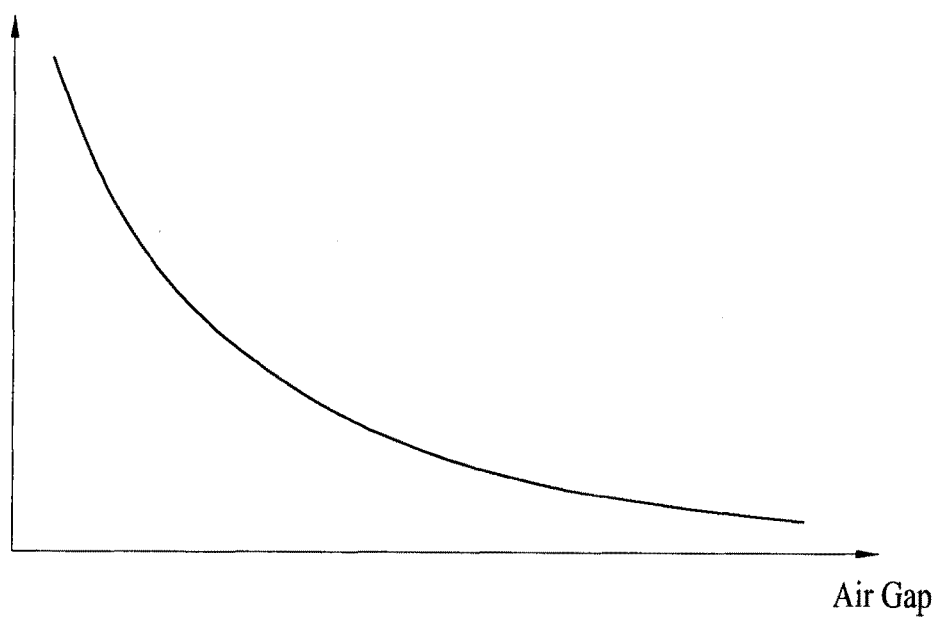
FIG. 4 is a diagram illustrating a correlation between a distance between magnetic units and a magnetic force.

As shown in FIG. 4, when the distance (namely, air gap) between the second magnetic unit 52 and the first magnetic unit 51 is decreased by the vibration of the drum 3, the repulsive force (namely, the strength of the magnetic force) between the second magnetic unit 52 and the first magnetic unit 51 will be increased. Accordingly, the tub 2 is likely to vibrate together with the drum 2 when the drum 3 is vibrating.

That is why the repulsive force provided to the first magnetic unit 51 is transferred to the tub 2, because the first magnetic unit 51 is fixed to the tub 2.

However, the vibration absorption unit 55 provided in the laundry treating apparatus 100 according to the present invention is arranged between the first magnetic unit 51 and the tub 2. Accordingly, the vibration of the drum 3 transferred to the tub 2 can be reduced as much as possible (see FIGS. 3(*b*) and (*c*)).

Meanwhile, in case of being provided between the cabinet 1 and the first magnetic unit 51 (see FIG. 3(*a*)), the vibration absorption unit 55 may be configured to absorb the noise and vibration generated when the tub 2 is collided with the cabinet 1.

Figure 5:
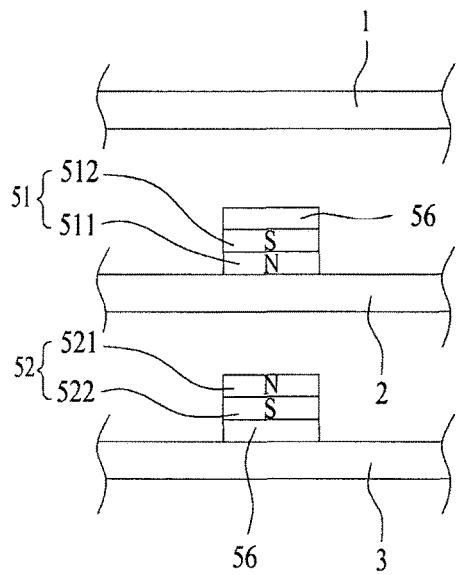
FIGS. 5 to 7 are diagrams illustrating another embodiment of the drum supporting unit provided in the laundry treating apparatus according to the present invention.
Figure 5:
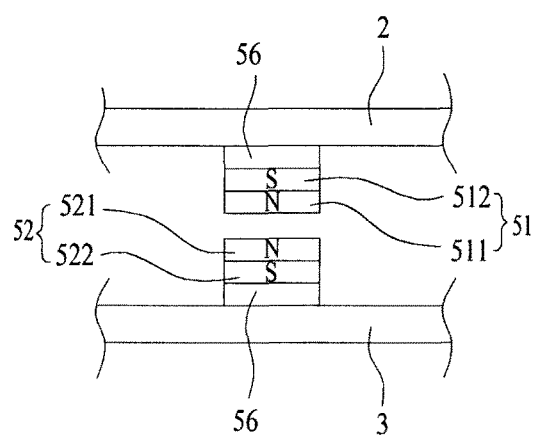
Figure 5:
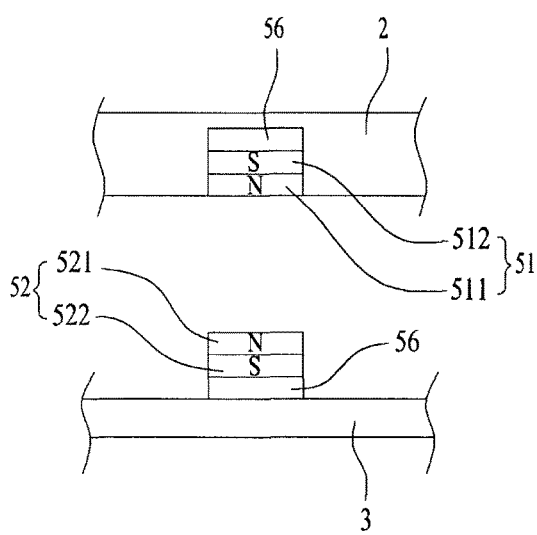

FIG. 5 is a diagram illustrating another embodiment of the height-direction magnetic unit (H) provided in the laundry treating apparatus according to the present invention. A drum supporting unit according to this embodiment may further include a magnetic force amplification unit 56.

Figure 6:
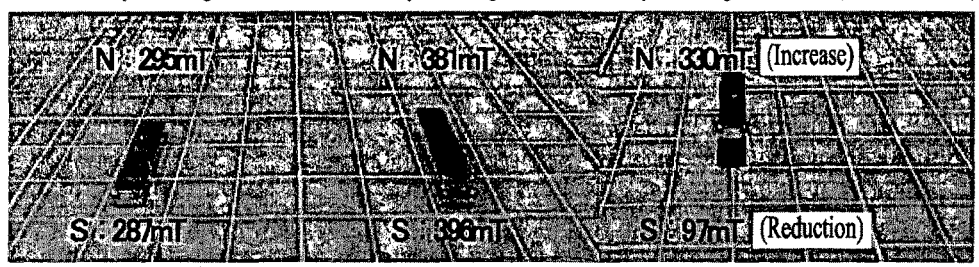
Figure 6:

As shown in FIG. 6, it is experimentally confirmed that the magnetic force of the other pole is increased, when a high permeable metallic material (iron, SU130, SS400 and so on) is positioned near one of magnetic poles (N pole or S pole) possessed by a permanent magnet.

In other words, in case of a bar-shaped magnet, magnetic forces of the bar-shaped magnet having N pole and S pole are 295 mT and 287 mT, respectively. When the high permeable metallic material (high permeability material) is positioned in S pole, it is confirmed that the magnetic force of N pole is increased up to 330 mT and the magnetic force of S pole is decreased to 97 mT. The increased magnetic force of N pole is smaller than the increased magnetic force of the two overlapped poles. However, it can be identified that the high permeable metallic material is useful for increasing the magnetic force of N pole provided one magnet.

Meanwhile, when the high permeable metallic material is positioned on S pole even in a button-shaped magnet, it can be identified that the magnetic force of N pole is increased from 463 mT to 500 mT and that of S pole is decreased from 462 mT to 245 mT.

Accordingly, the magnetic force amplification unit 56 shown in FIG. 5 is employed as means for increasing the repulsive force activated between the drum 3 and the tub 2, using the pole piece phenomenon identified in FIG. 6. The magnetic force amplification unit 56 may be formed in each of the first and second magnetic unit 51 and 52.

As shown in FIG. 5(*a*), one of the magnetic force amplification units 56 fixed in the first magnetic unit 51 may be positioned between the cabinet 1 and the tub 2 and the other one may be positioned between the second magnetic unit 52 and an outer circumferential surface of the drum 3.

According to such the structure mentioned above, the magnetic force possessed by N pole of the first magnetic unit 51 and the magnetic force possessed by N pole of the second magnetic unit 52 are increased, such that the drum provided in the laundry treating apparatus 100 according to the present invention may maintain the levitated state in the tub stably.

Moreover, the magnetic force amplification unit 56 decreases the magnetic forces emitted from S pole of the first magnetic unit 51 and S pole of the second magnetic unit 52, such that it can prevent errors electronic devices provided in the laundry treating apparatus caused by the magnetic forces provided by the first and second magnetic units.

The magnetic force amplification unit 56 may be means for preventing metallic substances contained in the laundry from being stuck to the inner circumferential surface of the drum 3 by the second magnetic unit 52.

Meanwhile, the magnetic force amplification unit 56 may be provided as a type shown in FIG. 5(*b*) or (*c*).

Specifically, the magnetic force amplification unit 56 may be fixed to an outer circumferential surface of the drum 3 to support the second magnetic unit 52. In contrast, the magnetic force amplification unit 56 provided in the tub 2 may be provided in an inner circumferential surface (see FIG. 5(*b*)) of the tub or an insertion hole provided in the tub 2 (see FIG. 5(*c*)) to support the first magnetic unit 51.

FIG. 5 is a diagram illustrating the structure that the drum 3 is levitated in the tub 2 by the repulsive forces of N poles provided in the first and second magnetic units 51 and 52 within the tub 2. Alternatively, the drum 3 may be levitated within the tub 2 by the repulsive forces of S poles.

Figure 7:
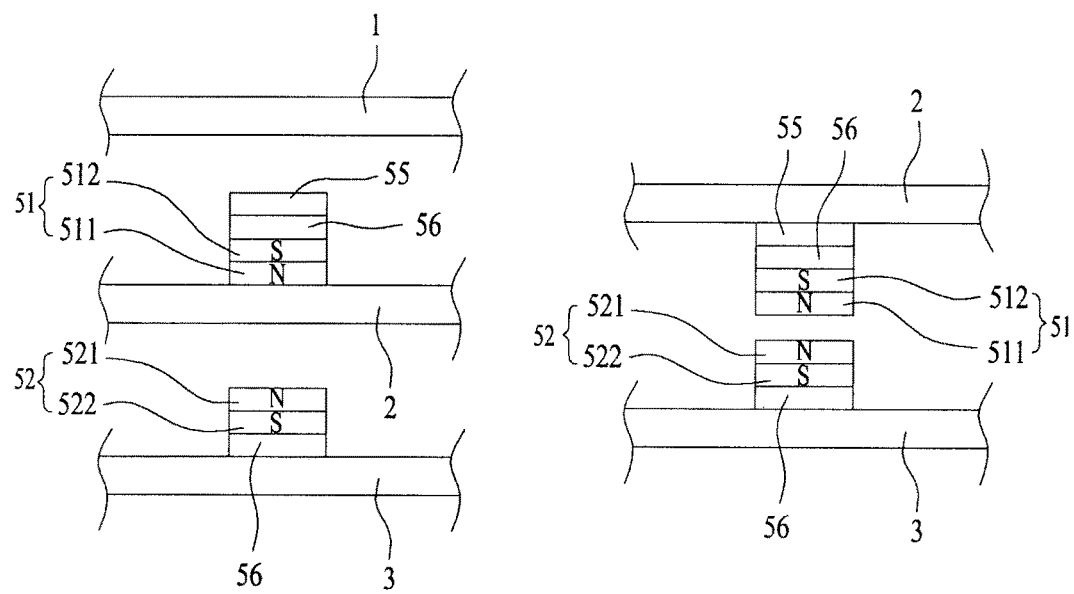
Figure 7:
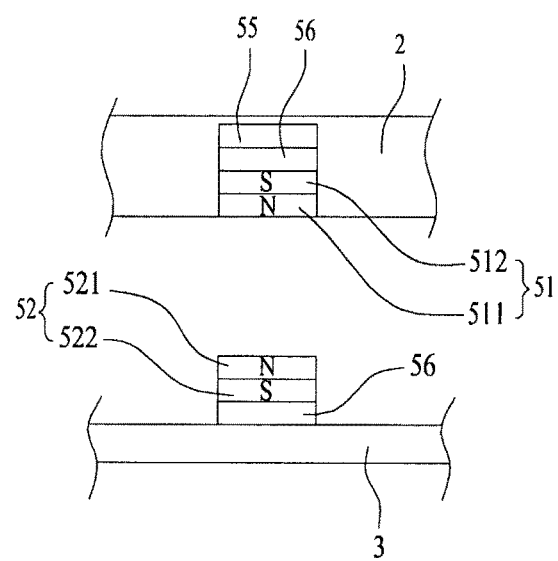

FIG. 7 is a diagram illustrating a further embodiment of a height-direction magnetic unit (H) provided in the laundry treating apparatus according to the present invention. In this embodiment, the drum supporting unit includes a vibration absorption unit 55 and a magnetic force amplification unit 56.

As shown in FIG. 7, a magnetic force amplification unit 56 and a vibration absorption unit 55 are disposed in the first magnetic unit 51 sequentially. Only a magnetic force amplification unit 56 may be provided in the second magnetic unit 52.

Alternatively, the second magnetic unit 52 may include both of the magnetic force amplification unit 56 and the vibration absorption unit 55. In this instance, it is preferred that the vibration absorption unit 55 is fixed to the drum and the magnetic force amplification unit 56 is fixed to the vibration unit 55 to support the second magnetic unit 52.

Even the longitudinal direction supporting unit (L) configured to make a uniform gap kept between front and rear surfaces of the drum and front and rear surfaces of the tub, respectively, may be fixed to the tub and the drum in the structure shown in FIGS. 3, 5 and 7.

Specifically, the third magnetic unit 53 has the same structure as the first magnetic unit 51 and the fourth magnetic unit 54 may have the same structure as the second magnetic unit 52. Accordingly, description of the structures the third and fourth magnetic units have will be omitted.

Next, the drum driving unit 6 provided in the laundry treating apparatus 100 according to the present invention will be described as follows.

The drum driving unit 6 provided in the laundry treating apparatus includes a motor 61 coupled to a rear surface of the tub 2 and a coupler 63 configured to transfer the rotational force provided by the motor to the drum.

Different from what is shown in FIG. 1, the drum driving unit 6 may include a pulley provided in the rear surface of the tub, a motor provided in a cabinet (for example, a bottom surface of the cabinet), a belt configured to connect the motor and the pulley with each other, and a coupler configured to transfer the rotational force of the pulley to the drum. Here, the drum driving unit shown in FIG. 1 will be exemplified as follows.

The motor 61 provided in the drum driving unit may include a stator 613 fixedly coupled to the rear surface of the tub 2 and a rotor 611 configured to surround the stator, with a shaft 615 coupled thereto.

Meanwhile, the coupler 63 provided in the drum driving unit 6 may connect the drum 3 and the shaft 615 with each other, such that a rotational center of the drum 3 can be movable in a predetermined range with respect to a center of the shaft 615.

In other words, the coupler 63 can transfer the rotational force of the shaft 615 to the drum 3, even when the rotational center of the drum does not accord with a center of the shaft 615. Accordingly, the coupler may prevent the vibration generated from the drum from being transferred to the tub 2 via the shaft 615.

That is why the rotational center of the drum 3 can move relatively with respect to the shaft 615.

As the structure of the coupler 63 will be described in detail, referring to FIG. 8, the coupler 63 may include a drum coupled portion 631 coupled to the drum 3, a shaft coupled portion 633 coupled to the shaft 615 of the motor, a connected portion 635 provide between the drum coupled portion and the shaft coupled portion, a coupled-portion guide 637 provided between the drum coupled portion 631 and the connected portion 635 to supportively guide the drum coupled portion 631 to reciprocate along a radial direction of the connected portion 635, and a connected-portion guide 639 provided between the connected portion 635 and the shaft coupled portion 633 to supportively guide the connected portion 635 to reciprocate along a radial direction of the shaft coupled portion 633.

The fixed portion guide 637 may include a fixed portion rail 6371 provided in one of the drum fixed portion 631 and the connected portion 635, and a fixed portion rail receiving groove 6373 provided between the other one of the two portions to receive the fixed portion rail 6371.

Meanwhile, the connected portion guide 639 may include a connected portion rail 6391 provided one of the shaft coupled portion 633 and the connected portion 635, and a connected portion rail receiving groove 6393 provided in the other one of the shaft fixed portion 633 and the connected portion 635 to movably receive the connected portion rail 6391.

Figure 8:
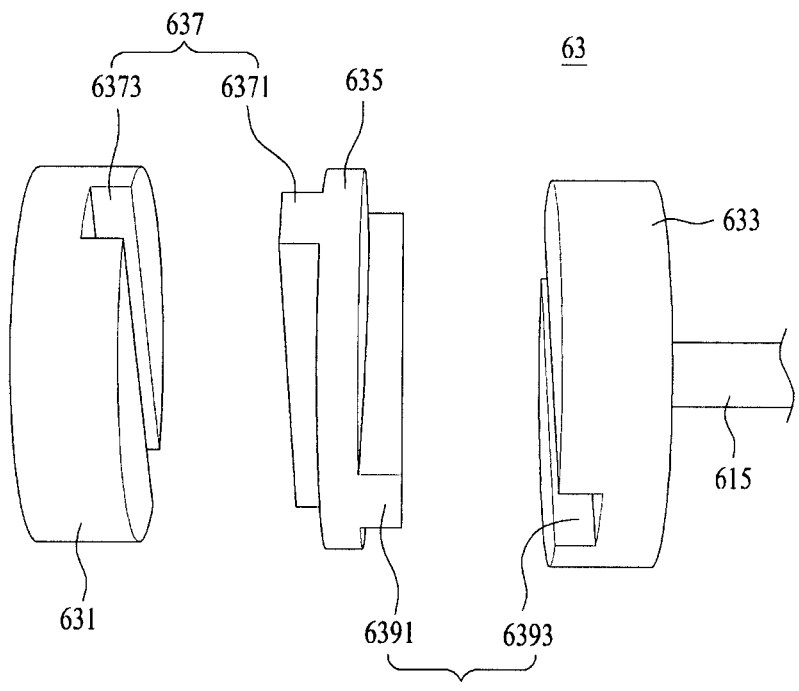
FIG. 8 is a diagram illustrating a coupler provided in the laundry treating apparatus according to the present invention.
Figure 8:
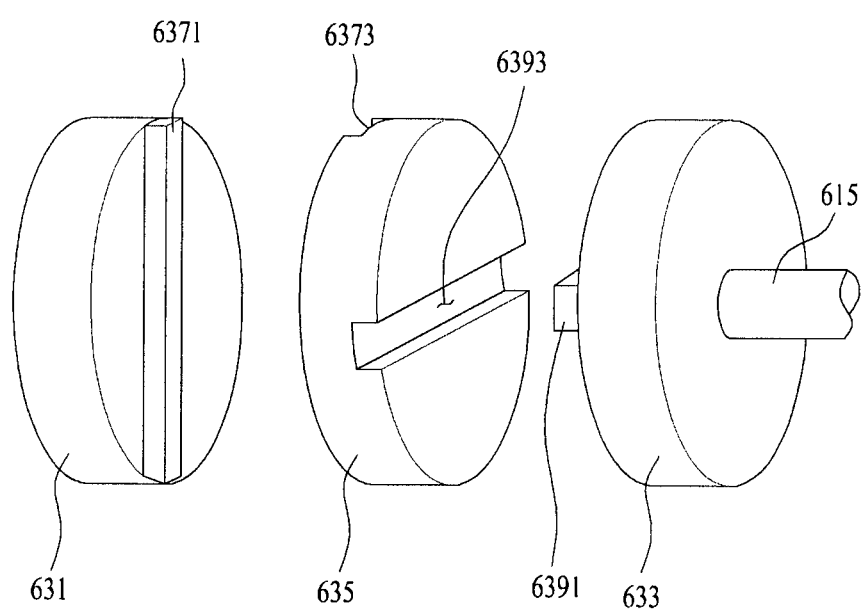

In other words, as shown in FIG. 8(*a*), the fixed portion rail 6371 may be projected toward the drum fixed portion 631 along the radial direction of the connected portion 635. The fixed portion rail receiving groove 6373 may be concavely bent along a radial direction of the drum coupled portion 631 to receive the fixed portion rail 6371.

The connected portion rail may be projected toward the shaft coupled portion 633 along a radial direction of the connected portion 635. The connected portion rail receiving groove 6393 may be concavely bent along a radial direction of the shaft coupled portion 633 to receive the connected portion rail 6391.

FIG. 8(*b*) shows that the coupled portion rail 6371 is projected toward the connected portion 635 along a radial direction of the drum fixed portion 631 and that the coupled portion rail receiving groove 6373 is concavely bent along a radial direction of the connected portion.

Meanwhile, although not shown in the drawings, the coupled portion rail 6371 may be provided in the drum coupled portion and the coupled portion rail receiving groove 6373 and the connected portion rail 6391 may be provided in the connected portion 635. Also, the connected portion rail receiving groove 6393 may be provided in the shaft coupled portion 633.

It is preferred that the coupled portion rail 6371 and the connected portion rail 6391 may be spaced apart 45~90 degrees from each other, such that the coupler 63 can absorb all of drum-height direction vibration and drum-width direction vibration (vibration in a perpendicular to the height direction of the drum).

The motor 61 is driven and the shaft 615 is rotated, such that the shaft coupled portion 633 may be rotated. After that the connected portion 635 coupled to the shaft coupled portion 633 is rotated by the connected portion guide 639.

When the connected portion 635 is rotated, the drum coupled portion 631 coupled to the connected portion 635 may be also rotated by the coupled portion guide 637, such that the drum 3 may be rotated.

Once the drum 3 is rotated, the drum-height direction vibration and the drum-width direction vibration of the drum may be generated by laundry.

The drum-height vibration is absorbed while the drum coupled portion 631 is reciprocating with respect to the connected portion 635. The drum-width direction vibration may be absorbed while the connected portion 635 is reciprocating with respect to the shaft coupled portion 633. Accordingly, the laundry treating apparatus according to the present invention may prevent or minimize the vibration generated from the drum from being transferred to the tub 2 or the motor 61, using the coupler 63 mentioned above.

Meanwhile, when the shaft 615 is rotated, the shaft coupled portion 633, the connected portion 635 and the drum coupled portion 631 are rotated together. Accordingly, the height-direction vibration of the drum may be absorbed while the connected portion 635 is reciprocating with respect to the shaft coupled portion 633. The drum-width direction vibration may be absorbed while the drum coupled portion 631 is reciprocating with respect to the connected portion 635.

As the vibration of the drum 3 is prevented from transferred to the motor 61, the vibration of the tub 2 having the motor 61 coupled thereto may be minimized and then the laundry treating apparatus according to the present invention may maximize the volume of the tub provided in the cabinet 1 providing a limited space.

In the conventional laundry treating apparatus, the tub is vibrated by the vibration generated in the drum. Considering a vibration range of the tub, the volume (washing capacity) of the tub has to be determined. However, the laundry treating apparatus according to the present invention may exclude the tub from the vibration system, only to maximize the volume of the tub.

The tub 2 is separated from the vibration system of the laundry treating apparatus, such that it may not be necessary for a gasket provided between the tub opening 21 and the opening 11 to absorb the vibration.

In the conventional laundry treating apparatus, the gasket is provided between the opening 11 and the tub opening 21 to prevent the wash water from leaking from the tub. The gasket has to be formed of a flexible material with a corrugation shape to prevent the vibration of the tub from being transferred to the cabinet.

However, such the gasket may be provided between the opening 11 and the tub opening 21 in the laundry treating apparatus according to the present invention, to prevent leakage of wash water out of the tub. However, the gasket need not be formed of the flexible material and such a corrugation shape to prevent the vibration absorption.

In addition, the tub 2 according to the present invention is separated from the vibration system of the laundry treating apparatus. It is not necessary to provide a tub supporting unit 4 in the laundry treating apparatus. Accordingly, the tub supporting unit 4 is not the means for absorbing the vibration of the tub 2 but the means simply for supporting an outer circumferential surface of the tub 2 with respect to the bottom surface of the cabinet 1.

Meanwhile, the shaft coupled portion 633 may be rotatably coupled to the rear surface of the tub 2 via a bearing 23 as shown in FIG. 1.

Although not shown in the drawings, the shaft 615 may be coupled to the rear surface of the tub (rotatably coupled to) via a bearing 23.

Figure 9:
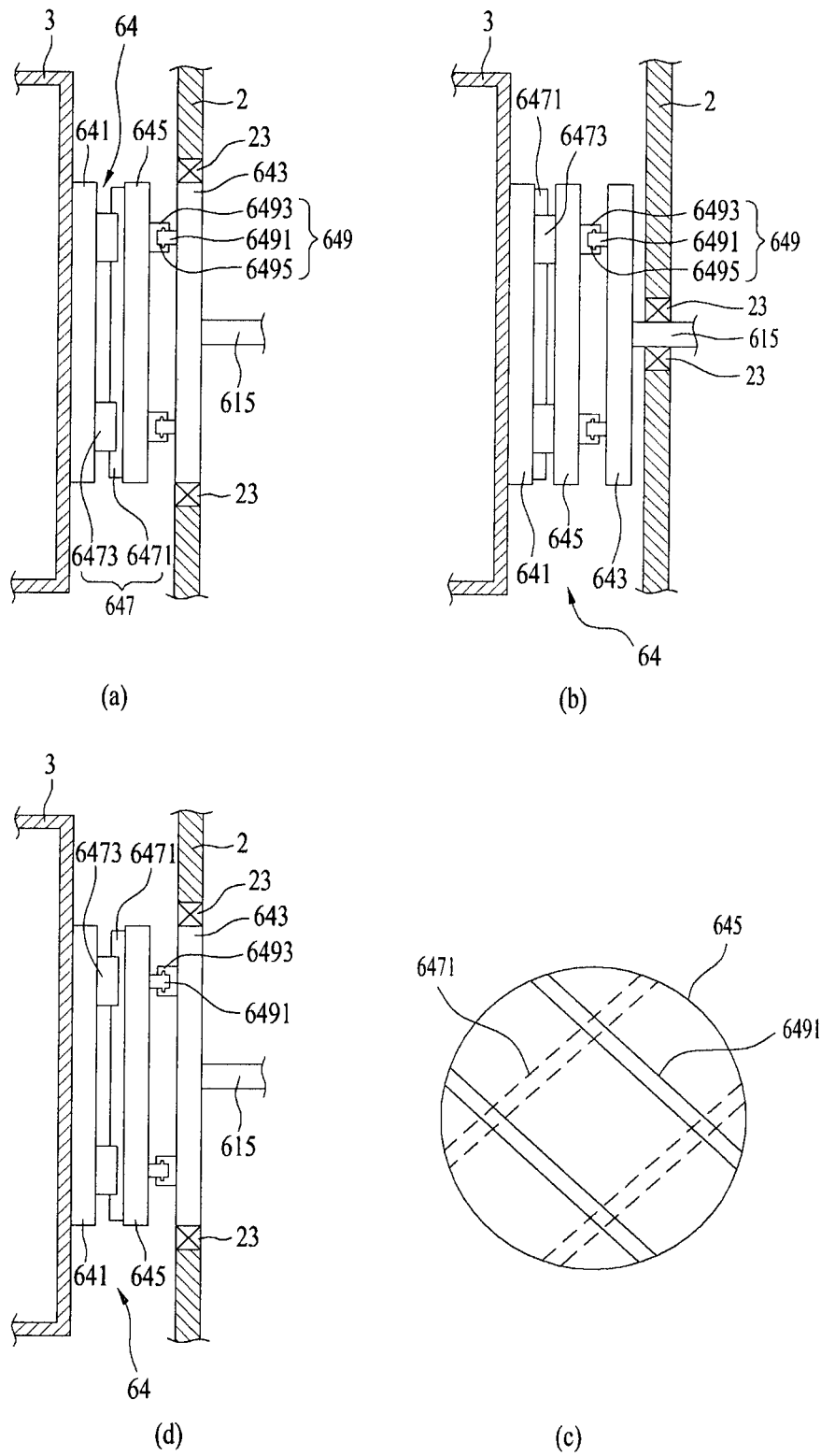
FIGS. 9 to 13 are diagrams illustrating another embodiment of the coupler provided in the laundry treating apparatus according to the present invention.

FIG. 9 is a diagram illustrating a still further embodiment of a coupler. In this embodiment, a coupler may also include a drum coupled portion 641 coupled to the drum 3, a shaft coupled portion 643 coupled to the shaft 615 of the motor, a connected portion 645 provide between the drum coupled portion and the shaft coupled portion, a coupled-portion guide 647 provided between the drum coupled portion 641 and the connected portion 645 to supportively guide the drum coupled portion 641 to reciprocate along a radial direction of the connected portion 645, and a connected-portion guide 649 provided between the connected portion 645 and the shaft coupled portion 643 to supportively guide the connected portion 645 to reciprocate along a radial direction of the shaft coupled portion 643.

Meanwhile, the coupled portion guide 647 provided in this embodiment of the coupler may include a coupled portion rail 6471 provided in one of the drum coupled portion 641 and the connected portion 645, a coupled portion rail guide 6473 provided in other one of the drum coupled portion 641 and the connected portion 645, and a coupled rail receiving groove (that has a similar structure of 6495) provided in the coupled portion rail guide 6473 to receive the coupled portion rail 6471 (see FIGS. 9(*a*) to (*c*)).

In addition, the connected portion guide 649 provided in this embodiment may include a connected portion rail 6491 provided in one of the connected guide 649 and the shaft coupled portion 643, a connected portion rail guide 6493 provided in the other one of the shaft coupled portion 643 and the connected portion 645, and a connected portion rail receiving groove 6495 provided in the connected portion rail guide 6493 to receive the connected portion rail 6491 (see FIGS. 9(*a*) to (*c*)).

It is preferred that the coupled portion rail 6471 and the connected portion rail 6491 are spaced 45~90 degrees from each other. The effect of such a structure is mentioned above and detailed description of the effect will be omitted accordingly.

The shaft coupled portion 643 is rotatably coupled to the tub 2 via a bearing 23 to prevent leakage of wash water out of the tub (see FIG. 9(*a*)). Alternatively, the shaft 615 may be rotatably coupled to the tub to prevent the leakage of the wash water (see FIG. 9(*b*)).

Figure 10:
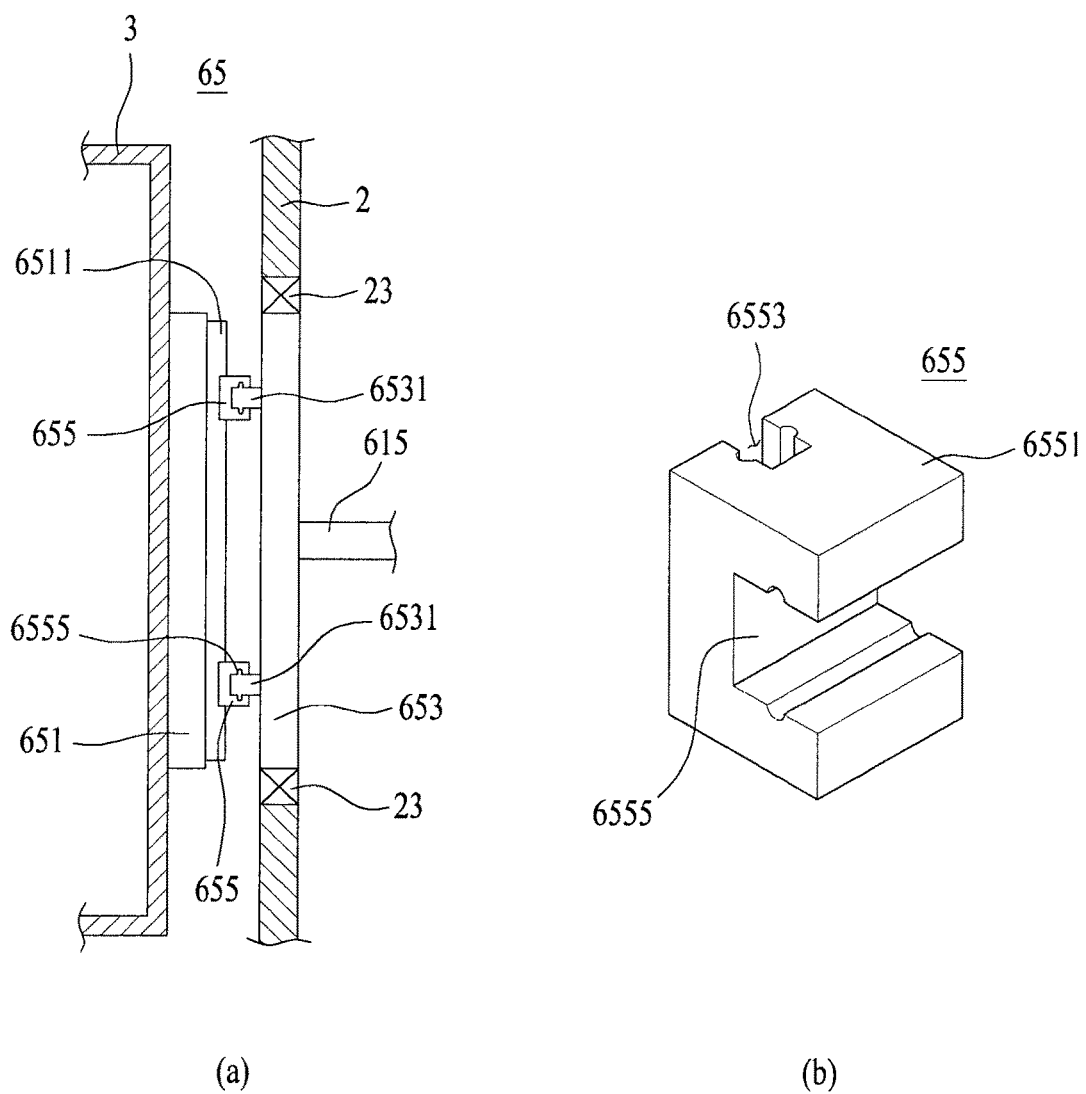

FIG. 10 is a diagram illustrating a still further embodiment of a coupler provided in the laundry treating apparatus according to the present invention. The coupler 65 according to this embodiment may include a drum coupled portion 651 coupled to the drum 3, a shaft coupled portion 653 coupled to the shaft 615, and a guider 655 provided between the drum coupled portion and the shaft coupled portion.

In this instance, the drum coupled portion 651 may include a drum coupled portion rail 6511 provided in a radial direction of the drum coupled portion, and the shaft coupled portion 653 may include a shaft coupled portion rail 6531 provided along a radial direction of the shaft coupled portion, spaced apart 45~90 degrees.

Meanwhile, the guider 655 may include a body 6551 for defining an exterior appearance thereof, a first rail guide 6553 provided in the body, with the drum coupled portion rail 6511 movably received therein.

Accordingly, when the shaft 615 of the motor is rotated, the shaft coupled portion 653, the guider 655 and the drum coupled portion 651 connected to the shaft coupled portion via the rails 6511 and 6531 such that the drum 3 may be rotated together.

Meanwhile, the drum-height direction vibration and the drum width direction vibration which are generated during the rotation of the drum can be absorbed by the relative motion of the drum coupled portion rail 6511, the shaft coupled portion rail 6531 and the guider 655. The vibration transferred to the tub 2 from the drum 3 via the shaft 615 can be prevented or minimized.

Figure 11:
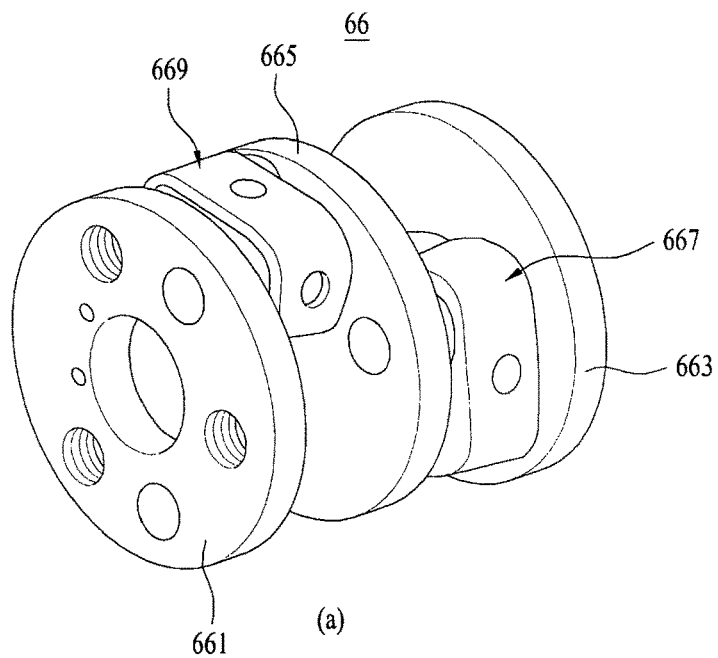
Figure 11:
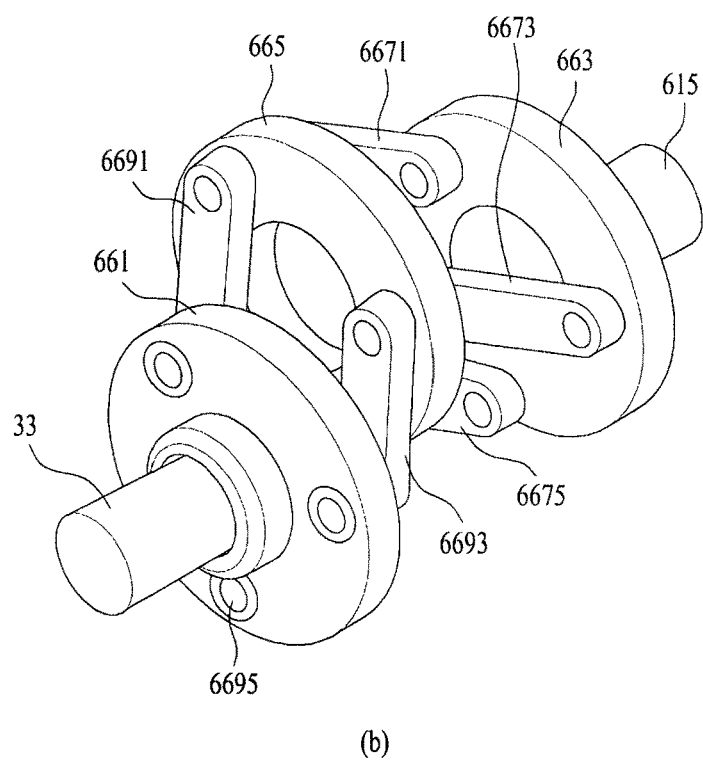

FIG. 11 is a diagram illustrating a still further embodiment of a coupler provided in the laundry treating apparatus according to the present invention. In this embodiment, a coupler 66 may include a drum coupled portion 661 coupled to the drum 3, a shaft coupled portion 663 coupled to the shaft 615, a connected portion 665 provided between the shaft coupled portion 663 and the drum coupled portion 661, a shaft coupled portion link 667 having one end rotatably coupled to the connected portion and the other end rotatably coupled to the shaft coupled portion 663, and a drum coupled portion link 669 having one end rotatably coupled to the drum coupled portion 661 and the other end rotatably coupled to the connected portion 665.

The shaft coupled portion link 667 connects the shaft coupled portion 663 and the connected portion 665 with each other to make a rotational center of the connected portion 665 spaced apart a predetermined distance from a rotational center of the shaft coupled portion (the shaft of the motor 615), and it transfers a rotational force of the shaft coupled portion 663 to the connected portion 665.

For that, the shaft coupled portion 667 may include third bars 6671, 6673 and 6675 spaced apart a predetermined distance 120 degrees from each other.

Meanwhile, the drum coupled portion link 669 connects the drum coupled portion 661 and the connected portion 665 with each other to make the rotation center of the drum coupled portion 661 spaced apart a predetermined distance from the rotation center of the connected portion 665, and also it transfers the rotational force of the connected portion 665 to the drum coupled portion 661.

For that, the drum coupled portion link 669 may include third bars 6691, 6693 and 6695 spaced apart a predetermined distance 120 degrees from each other.

The drum 3 provided in the laundry treating apparatus according to the present invention may maintain the levitated state within the tub 2 by the magnetic force of the drum supporting unit (H and L). Accordingly, when shaft 615 is rotated, the shaft coupled portion 663, the connected portion 665 and the drum coupled portion 661 may be rotated in a state shown in FIG. 11(*a*).

However, when the vibration is generated in the drum 3, the coupler 66 may make a rotation center of the drum coupled portion 661 and a rotational center of the connected portion 665 spaced apart a predetermined distance from a rotational center 615 of the shaft coupled portion 663, as shown in FIG. 11(*b*).

Accordingly, the coupler 66 according to this embodiment can also prevent or minimize the vibration transferred to the shaft coupled portion 663 from the drum 3.

Figure 12:
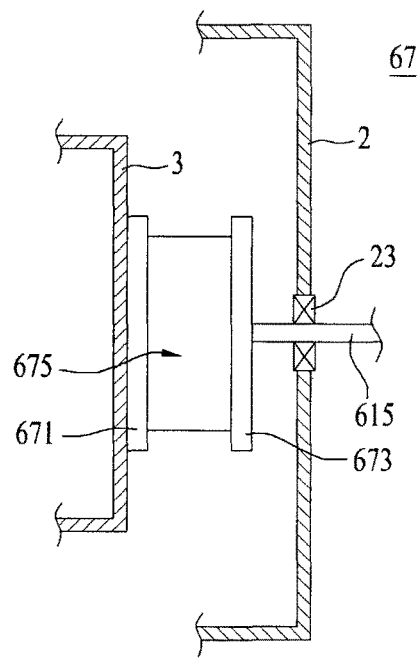
Figure 12:
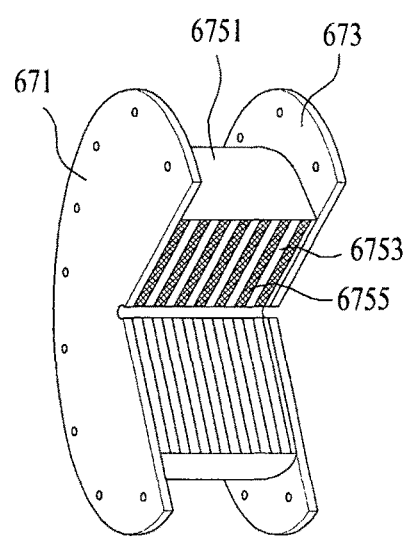

FIG. 12 is a still further embodiment of a coupler provided in the laundry treating apparatus according to the present invention. In this embodiment, a coupler 67 may include a drum coupled portion 671 coupled to the drum 3, a shaft coupled portion 673 coupled to the shaft 615, and a connected portion 675 formed of a flexible material (for example, a rubber material) to connect the shaft coupled portion 673 and the drum coupled portion 671 with each other.

Accordingly, the drum height direction vibration and the drum width direction vibration which are generated during the rotation of the drum 3 may be consumed as energy for transform the connected portion 675, such that the vibration of the drum can be prevented from being transferred to the motor and the tub via the shaft 615.

As the structure of the connected portion 675 will be described in detail, referring to FIG. 12(*b*), the connected portion 675 may include a connection pipe 6751 configured to connect the shaft coupled portion and the drum coupled portion with each other, an flexible plate 6753 provided in the connection pipe, and a metallic plate 6755 provided in the connection pipe.

The reason why the metallic plate and the flexible plate are provided in the connection pipe 6751 is to absorb the longitudinal direction vibration of the drum. Accordingly, it is preferred that a plurality of flexible and metallic plates 6753 and 6755 are disposed alternately.

Figure 13:
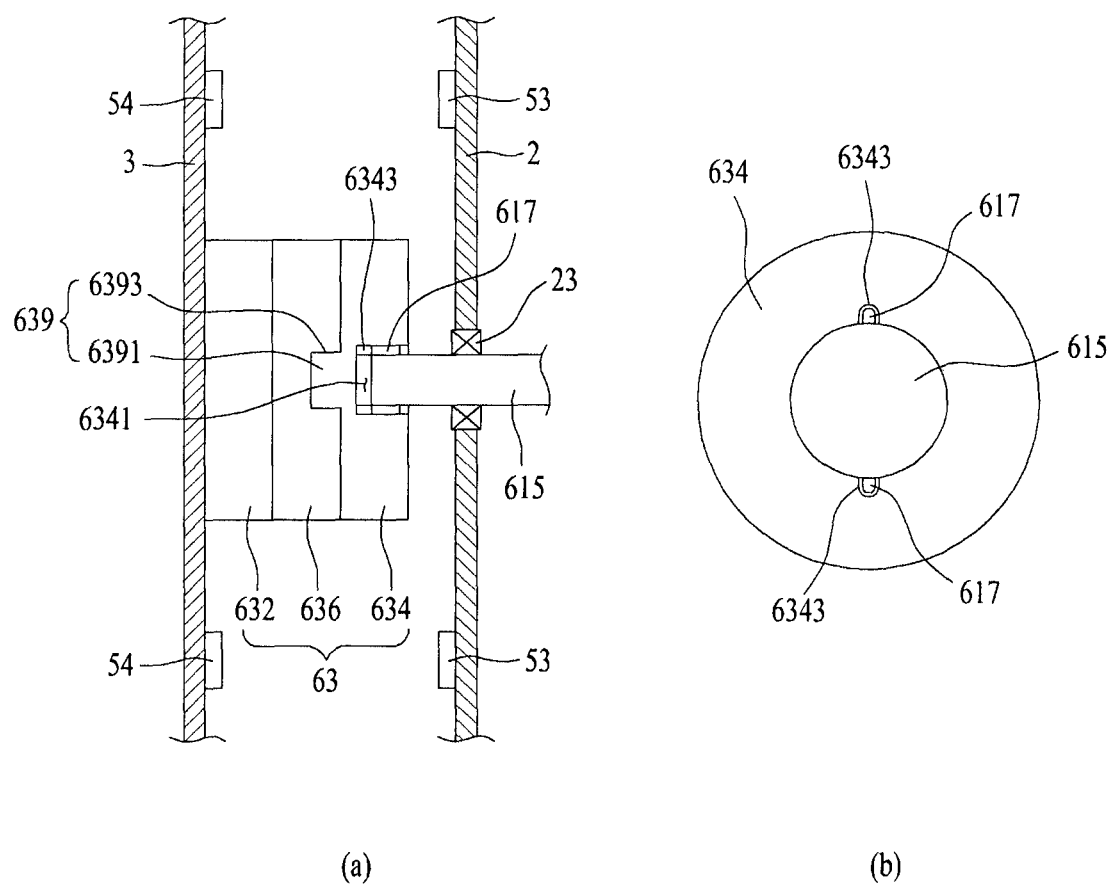

FIG. 13 is a still further embodiment of a coupler provided in the laundry treating apparatus according to the present invention. A coupler according to this embodiment has a similar structure as the coupler shown in FIG. 8, except that the coupler can absorb the drum longitudinal direction vibration.

In this embodiment, the coupler 63 may include a drum coupled portion 632 coupled to the drum, a shaft coupled portion 634 coupled to the shaft 615, and a connected portion 636 provided between the drum coupled portion and the shaft coupled portion, like the coupler shown in FIG. 8.

In addition, a coupled portion guide (not shown, a coupled portion rail and a coupled portion rail receiving groove) configured to guide reciprocation of the drum coupled portion may be provided between the drum coupled portion 632 and the connected portion 634. Connected portion guides 6391 and 6393 are provided between the connected portion 634 and the shaft coupled portion 634 to guide reciprocation of the connected portion.

Meanwhile, this embodiment may further include a first guider 617 provided in an outer circumferential surface of the shaft 615 along a longitudinal direction of the shaft 615. A shaft receiving groove 6341 configured to receive the shaft 615 is provided in the shaft coupled portion 634 and a second guider 6343 is provided in an outer circumferential surface of the shaft receiving groove 6341 to be coupled to the first guider 617.

In this instance, it is preferred that the depth of the shaft receiving groove 634 is determined so as to allow the first guider 617 and the second guider 6343 guide the reciprocation of the shaft coupled portion 634 along a longitudinal direction of the shaft 615.

Accordingly, when the shaft 615 is rotated, the shaft coupled portion 634 is rotated by the first guider 617 and the second guider 6343 and the drum 3 is rotated by the connected portion 636 and the drum coupled portion 632.

The drum height direction vibration and the drum width direction vibration which are generated during the rotation of the drum may be removed by the coupled guide (637, see FIG. 8) and the connected portion guide 639.

Meanwhile, the drum longitudinal direction vibration may be absorbed by the reciprocation of the shaft coupled portion 634 along a longitudinal direction of the shaft via the guide of the first and second guiders 617 and 6343 and the longitudinal direction magnetic units 53 and 54.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A laundry treating apparatus comprising:
   a cabinet including an opening through which laundry is introduced;
   a tub provided in the cabinet, the tub including a tub opening in communication with the opening;
   a drum provided in the tub, and configured to store the laundry, the drum including a drum opening in communication with the tub opening;
   a drum supporting unit configured to levitate the drum within the tub, using a repulsive force generated between magnetic units with the same magnetic pole;
   a motor mounted to an outer portion of the tub, the motor including a shaft; and
   a coupler configured to connect the drum and the shaft to each other to rotate the drum and to cause a rotation center of the drum to be movable with respect to a rotation center of the shaft in a predetermined distance range toward a perpendicular direction of the shaft
   wherein the coupler comprises:
      a shaft coupled portion coupled to the shaft and that is configured to rotate with the shaft;
      a drum coupled portion coupled to the drum and that is provided separately from the shaft;
      a connected portion provided between the shaft coupled portion and the drum coupled portion, and that is configured to couple the shaft coupled portion with the drum coupled portion to transfer rotation power of the shaft to the drum coupled portion,
      wherein the connected portion is configured to be moveable in the radial direction of the shaft in the shaft coupled portion and the drum coupled portion, respectively.

2. The laundry treating apparatus according to claim 1, wherein:
   a coupled portion guide is configured to guide reciprocation of the drum coupled portion along a radial direction of the connected portion; and
   the connected portion guide is configured to guide reciprocation of the connected portion along a radial direction of the shaft coupled portion.

3. The laundry treating apparatus according to claim 2, wherein the coupled portion guide comprises a coupled portion rail provided in one of the drum coupled portion and the connected portion; and coupled portion rail receiving groove provided in the other one of the drum coupled portion and the connected portion to receive the coupled portion rail movably, and
   the connected portion guide comprises a connected portion rail provided in one of the shaft coupled portion and the connected portion; and
   a connected portion rail receiving groove provided in the other one of the shaft coupled portion and the connected portion to receive the connected portion rail movably.

4. The laundry treating apparatus according to claim 3, wherein the coupled portion rail is provided along a radial direction of one of the drum coupled portion and the connected portion, and
   the connected portion rail is provided along a radial direction of the shaft coupled portion and the connected portion, and
   the coupled portion rail and the connected portion rail are spaced apart 90 degrees from each other.

5. The laundry treating apparatus according to claim 3, wherein the motor further comprises a first guider provided in an outer circumferential surface of the shaft along a longitudinal direction of the shaft, and
   the shaft coupled portion further comprises a shaft receiving groove configured to receive the shaft; and a second guider provided in an outer circumferential surface of the shaft receiving groove to be coupled to the first guider, and
   the shaft coupled portion reciprocates along a longitudinal direction of the shaft by the first guider and the second guider.

6. The laundry treating apparatus according to claim 2, wherein the coupled portion guide comprises a coupled portion rail provided in one of the drum coupled portion and the connected portion;
   a coupled portion rail guide provided in the other one of the drum coupled portion and the connected portion; and a coupled portion rail receiving groove provided in the coupled portion rail guide to receive the coupled portion rail, and
   the connected portion guide comprises a connected portion rail provided in one of the shaft coupled portion and the connected portion; a connected portion rail guide provided in the other one of the shaft coupled portion and the connected portion; and a connected portion rail receiving groove provided in the connected portion rail guide to receive the connected portion rail.

7. The laundry treating apparatus according to claim 6, wherein the coupled portion rail is provided in a radial direction of one of the drum coupled portion and the connected portion, and the connected portion rail is provided in along a radial direction of one of the shaft coupled portion and the connected portion, and the coupled portion rail and the connected portion rail are spaced apart 90 degrees from each other.

* * * * *